Aug. 9, 1949.　　　　　　　　R. T. LAMB　　　　　　　2,478,406
DIRECT-READING GAMMA-MEASURING DEVICE USING
OVERLAPPING NEUTRAL DENSITY WEDGES
Filed Aug. 19, 1944　　　　　　　　　　　　　　　　2 Sheets-Sheet 1
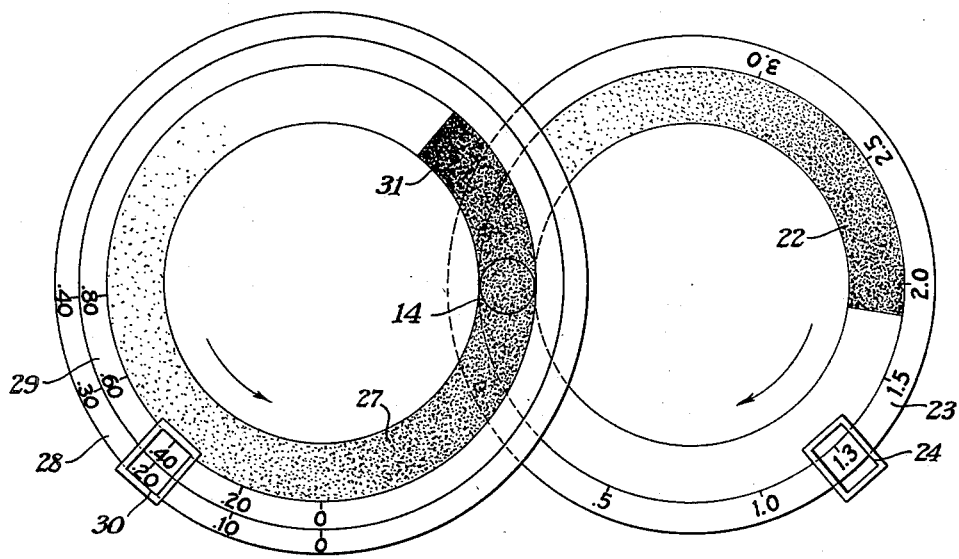
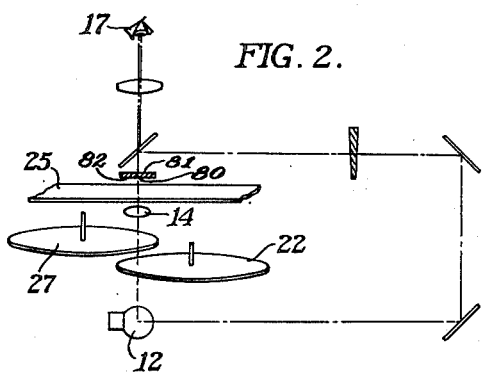
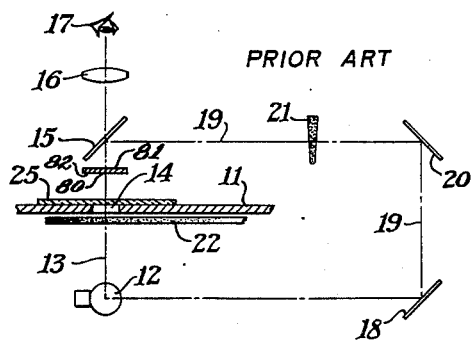
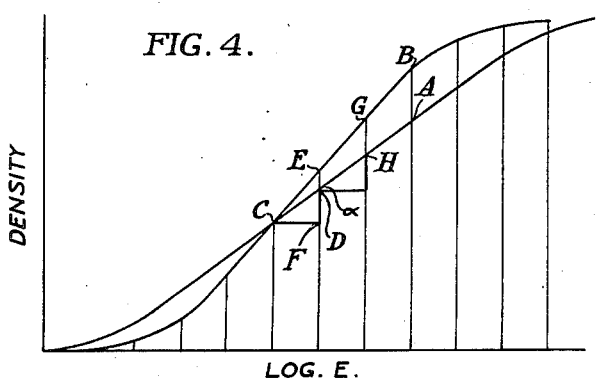
REGINALD T. LAMB
*INVENTOR*
BY
*ATTORNEYS*

Aug. 9, 1949.　　　　R. T. LAMB　　　　2,478,406
DIRECT-READING GAMMA-MEASURING DEVICE USING
OVERLAPPING NEUTRAL DENSITY WEDGES
Filed Aug. 19, 1944　　　　　　　　　　　　2 Sheets-Sheet 2

REGINALD T. LAMB
INVENTOR
ATTORNEYS

Patented Aug. 9, 1949

2,478,406

UNITED STATES PATENT OFFICE 2,478,406

DIRECT-READING GAMMA-MEASURING DEVICE USING OVERLAPPING NEUTRAL DENSITY WEDGES

Reginald T. Lamb, Rochester, N. Y., assignor to Eastman Kodak Company, Rochester, N. Y., a corporation of New Jersey Application August 19, 1944, Serial No. 550,243

4 Claims. (Cl. 88—14)

The present invention relates to sensitometry, and more particularly to a novel device for the direct determination of the gamma of a sensitometric strip.

As is well known, it is usual to express the relationship between density and exposure, as determined from the densities of the sensitometric strip, in the form of a curve. When density is plotted against the logarithm of exposure, curves of the type shown in Fig. 4 are obtained, the curve A being for one strip while curve B represents another strip. These curves, as is well known in the art, are referred to as H and D curves.

A considerable portion of these curves, in the case of most photographic materials, is represented by a straight line. The exposure range within the limits of the straight-line portion constitutes the region of correct exposure; for, throughout this range of exposure, density is directly proportionate to the logarithm of the exposure. Therefore, for correct proportional rendering of the various brightnesses of the subjects in the negative, the camera exposure must be such that the exposures produced by the light reflected from the different parts of the subject are all within the straight line portion of the curve, all of which is well known to those in the art.

For many purposes, it is desirable or essential to plot the entire curve and to then determine the various factors, including gamma, from the curve. In other cases, however, such as in routine commercial processing control, it may be highly desirable to obtain the gamma reading directly without necessitating the making of the various density readings required to plot the complete curve, as is the usual practice. As is well known, gamma is the slope of the straight-line portion of the curve, and, obviously is the same for any point along the portion. The value of the gamma is, however, the tangent of the angle alpha ($\alpha$) and is the density difference between any two selected points C and D divided by the difference between the logs of the exposures at said points. Points C and D may be adjacent or widely separated, the value of the gamma being the same, as is apparent.

The gamma for curve A is represented by the value $$\frac{DF}{CF}$$

while the gamma for curve B is represented by the value $$\frac{EF}{CF}$$

Since CF is common to both values, the relation of the gamma curve A to the gamma of curve B is represented by the ratio of line DF to EF. Thus if a density wedge were used in determining the density at the points C, D, and E, and this wedge were calibrated in terms of the gammas which the densities at D and E would represent if considered as the difference in densities between C and D, and C and E, the gammas between C and D, and C and E could be determined directly without requiring the plotting of the entire curve. By means of this arrangement, only two points on any curve would be necessary to determine the gamma, the advantages of which would be obvious to those in the art.

The present invention has, therefore, as its principal object the provision of an arrangement by which the gamma of a sensitometric strip may be indicated directly.

A further object of the invention is the provision of a direct reading gamma measuring device which can be readily and easily installed on the existing densitometers without any material alteration thereof.

Yet another object of the invention is the provision of such a gamma reading device which may be mounted on existing densitometers without in any way altering their effectiveness as a densitometer.

A further object of the invention is the provision of a direct reading gamma measuring device which is simple in construction, easy to operate, easy to read, and highly effective in use.

To these and other ends, the invention resides in certain improvements and combinations of parts, all as will be hereinafter more fully described, the novel features being pointed out in the claims at the end of the specification.

In the drawings:

Fig. 1 is a top view of the density wedge of the usual densitometer, showing the relation thereto of the additional gamma wedge of the present invention;

Fig. 2 is a schematic view of a well known densitometer showing the relation thereto of the gamma wedge of the present invention;

Fig. 3 is a view similar to Fig. 2 showing one type of a densitometer used for measuring densities of a sensitometric strip;

Fig. 4 shows a graph representing the H and D curves secured from two different sensitometric strips;

Similar reference numerals throughout the various views indicate the same parts.

Figure 5:
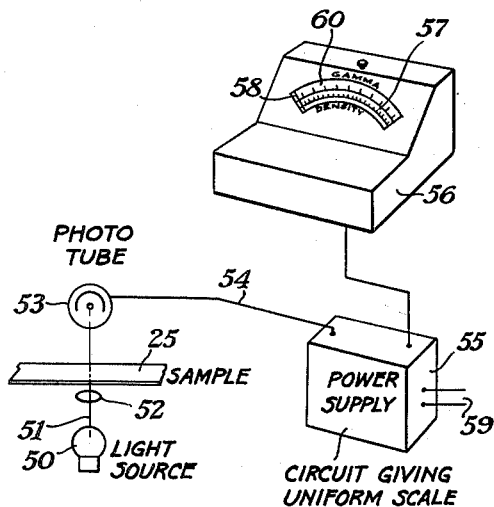
Fig. 5 is a schematic view of another form of a densitometer showing the relation thereto of the gamma scale of the present invention.

Fig. 3 of the drawing shows a densitometer of well-known construction which is provided with a suitable housing, only the top 11 of which is shown, which houses a light source in the form of an electric lamp 12 which provides a direct light beam 13 which passes through an aperture 14 in the top 11 and then through the unsilvered portion 80 of the mirror 81 to form, on mirror 15, the well-known central light area of the comparison field which is viewed through the lens 16 by the observer's eye positioned at 17. The housing is also provided with a mirror 18 which reflects a comparison beam 19 to a second reflecting mirror 20 through a neutral density wedge 21 to the underside of the mirror 15 which reflects the beam 19 downwardly onto the silvered portion 82 of the mirror 80 which then reflects the beam back onto the mirror 15 to form the outer constant light area which is concentric to the central area formed by beam 13, as is well known to those in the art. A circular density wedge 22, of well known construction, is mounted in the housing and is positioned below the aperture 14 and in the direct beam 13 to vary the light transmitted to the film strip 25 to be measured. To make measurements, photometric balance is first obtained with the density wedge 22 set at zero (0) by slightly moving the light source 12 back and forth by means, not shown but well known to those in the art. After the proper balance has been obtained, the first step in the film or sensitometric strip is placed over the aperture 14 and the wedge 22 adjusted until the two beams 13 and 19 are of the same brightness. The reading of the scale 23 on the wedge 22 is then noted in the window 24 formed in the top 11. The point of the curve corresponding to the density and exposure is then plotted. The strip is then moved to bring the next or another step into position and the wedge 22 again is adjusted until the two beams 13 and 19 are again matched in brightness, and the corresponding point of the curve plotted. This procedure is continued until the various points are secured and a curve is drawn. Such curves are shown in Fig. 4 and are well known to those in the art.

The structure and procedure so far described are old and do not constitute a part of the present invention. The densitometer itself is of the type fully shown and described in a patent to McFarlane et al., No. 2,146,904, issued February 14, 1939, to which reference may be had for a complete showing and description. Only so much of the densitometer as is necessary for a complete and full understanding of the present invention will be herein shown.

Fig. 2 shows a densitometer of the type illustrated in Fig. 3 and corresponding parts will be designated by the same numerals. It will be noted that the densitometer illustrated in Fig. 2 has, in addition to the usual density wedge 22, an additional density wedge 27. As the latter is calibrated to read gamma directly it may be designated as a gamma wedge rather than a density wedge. This gamma wedge 27 may differ from wedge 22 in having a shorter density range in order to expand the scale for easier reading.

This gamma wedge is provided with two scales 28 and 29 portions of which are viewable through a window 30 formed in the top 11. The scale 29 is for directly reading the gamma between adjacent steps on the H and D curves, such as between C and D, or C and E, while the scale 28 is used when alternate steps are used such as C and G and C and H on the curves A and B. The gamma wedge 27 is also provided with the usual variable density portion 31 similar to that on the density wedge 22.

The scales 28 and 29 are calibrated to read gamma directly. For example, scale 29 is calibrated in terms of the gamma which each density of the film strip 25 would represent if considered as the difference in density between two adjacent steps, such as between the steps C and D, or C and E. Thus the difference in density between C and D is calibrated on the scale 29 in terms of the gamma between these points thus giving the gamma reading directly. Similarly scale 28 will read the gamma between alternate points such as between C and H, and C and G. By means of this arrangement, only two readings need be taken to determine the gamma of any sensitometric strip.

The procedure is as follows: with the film strip 25 removed and with the densest portions of the wedges 22 and 27 in position below the aperture 14 and in the direct beam 13, the two beams are adjusted to secure the necessary photometric balance. With the wedges thus positioned, the zero of scale 23 of wedge 22 will then register with the window 24, and the zero of scales 28 and 29 will register with the window 30 and the entire instrument is zeroed. Then the first step of the strip 25, such as that represented by the point C, is placed over the aperture 14. As the strip 25 has added density to the direct beam 13, the density wedge 22 must be adjusted to a less dense portion so as to remove density from the beam 13 equal to that added by the strip 25 so as to bring the beams 13 and 19 back into balance. At this point, the wedge 22 may be in a position such as illustrated in Fig. 1 with the scale 23 thereof visible in the window 24, while the wedge 27 remains adjusted to zero. In other words, the wedge 27 is maintained stationary during the first adjustment. If, however, only the gamma is to be determined, the reading of the scale 23 may be ignored. Now a second step of the strip, such as, for example, that corresponding to point D, is placed in position over the aperture 14. The density wedge 22 is now held stationary, and the gamma wedge adjusted to bring a less dense portion of the gamma wedge into the direct beam 13 to remove density therefrom equal to that added by the second positioned steps. As the wedge 22 remains stationary, it constitutes, in effect, a zeroing means for the gamma wedge with relation to the first step of the film strip. As the scale 29 is calibrated in terms of the gamma between points C and D, the gamma between these points can be read directly from the scale 29 through the window 30. This reading is shown as being .40 which is the gamma of the straight line portion of curve A.

The value .20 which also appears in the window 30 must not be confusingly considered as the gamma of the curve A between the alternate points such as C and H, as it is obvious that the gamma or slope of the curve A is the same at all points along the straight-line portion thereof. It is also obvious that if the point H had been selected, the density would be greater than that at D so that the gamma wedge 27 would have to be adjusted to remove additional density from the beam 13. When, however, the two beams were balanced, the reading of .40 of the lower scale 28 would then appear in the window 30, showing that the gamma between the points C and H is also equal to .40. Thus the gamma between two adjacent points or between two alternate points could be used in the direct determination of gamma.

If, however, the strip represented by curve B is being analyzed, the density wedge 22 is adjusted, as above described, for the point C, the gamma wedge being at zero. The step corresponding to point E is then placed in position in the direct beam 13 and the gamma wedge 27 is then adjusted to remove density from the beam 13 until the beams 13 and 19 are again in balance, and the gamma read directly from scale 29. It is apparent, however, from an inspection of Fig. 4, that the difference in density between C and E is greater than that between C and D and hence the gamma of the curve B will be greater than that of curve A, and the difference between the gammas is proportional to the difference between the distances EF and DF. Therefore, when the gamma wedge 27 is adjusted to balance the step E a portion of the scale will appear in the window 30 to directly indicate the gamma between the points C and E, and this gamma reading will be higher than that for corresponding points on curve A. If desired, a slide or other suitable member, not shown, may be provided for the window 30 to block off the scale not being used so as to avoid any possible confusing in the reading of the gamma scales.

Figure 8:
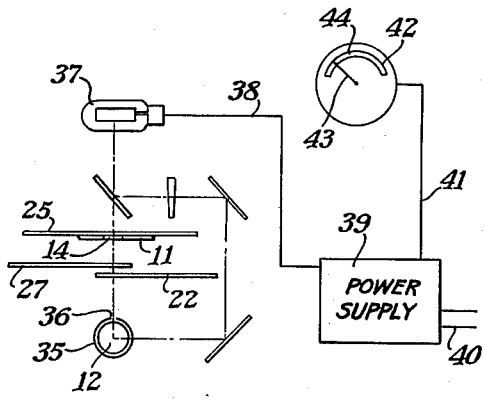
Fig. 8 is a schematic view of another densitometer similar to that illustrated in Figs. 2 and 3, showing the relation thereto of the gamma wedge of the present invention.

Fig. 8 shows a schematic arrangement of a densitometer somewhat similar in its broad aspects to those illustrated in Figs. 2 and 3, and parts corresponding to Figs. 2 and 3 will be designated by the same numerals. The arrangement illustrated in Fig. 8 differs from that above described in that the light is alternately supplied to the direct and comparison beams 13 and 19 by means of a shutter or scanner 35 surrounding the lamp or light source 12 and provided with a single slit or aperture 36. Means, not shown, is provided for continuously and uniformly moving the scanner 35 so that the slit 36 thereof may be alternately brought into registry with the paths of the beams 13 and 19 to alternately impress these beams on the light sensitive element or tube 37 positioned above the mirror 15 and substantially in the position occupied by the observer's eyes 17, Figs. 2 and 3. This tube 37 is connected by a wire 38 to a power supply broadly indicated by the numeral 39. Electrical energy is supplied to the power supply 39 from a suitable source of electric current through the wires 40. The power supply 39 is also connected by a lead 41 to a meter 42 having a pointer 43 movable over a scale 44.

With this arrangement, the procedure is as follows: with no film in place over the aperture 14 and with the densest portions of the wedges 22 and 27 in the direct beam 13, the scanner 35 is rotated and the beams are adjusted to give a zero, or any other predetermined reading, on the meter scale 44. Then the first step to be measured is placed over the aperture 14, and, with the light alternately supplied to the beams 13 and 19, the density wedge 22 is adjusted until the meter 42 again reads 0, or the said predetermined reading. If desired, at this point the density of the strip may be read on the scale 23 of the density wedge 22. If, however, only the gamma is desired, the reading on the scale 23 may be ignored. The next step of the strip is then moved into position to overlie the aperture 14 and with the density wedge stationary, the gamma wedge 27 is adjusted, in the manner above described, until the meter 43 again reads the 0, or the predetermined reading. The gamma of the strip is then read directly on the proper scale 28 or 29 on the density wedge 27, as above described. Here again, the density wedge 22 acts to zero the gamma wedge 27 for the first step of the strip, as explained above.

In this embodiment, the tube 37, power supply 39 and the meter 42 replace the observer's eye in securing the proper balance between the two beams. The manipulations of the density wedge 22 and the gamma wedge 27 are, however, precisely the same as in the embodiment shown in Fig. 2. In both embodiments, the gamma of the strip is read directly from the appropriate scale on the gamma wedge 27.

Figure 6:
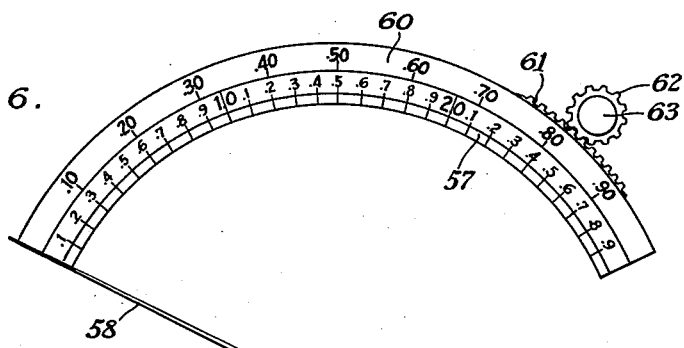
Fig. 6 is a view of the density and gamma scales of the meter illustrated in Fig. 5, showing the relation of the scales when no film or strip is in position to be read.
Figure 7:
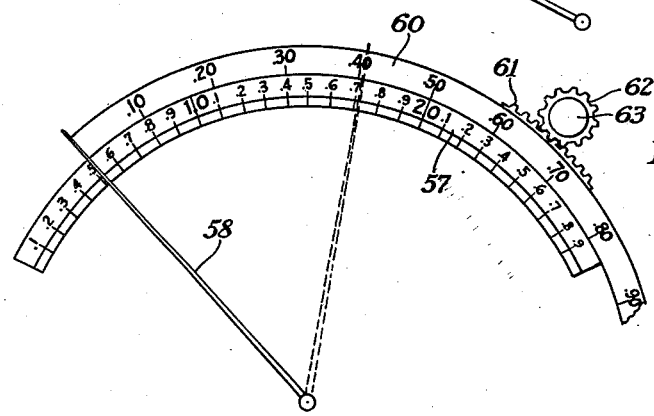
Fig. 7 shows the relative position of the scales of the densitometer shown in Fig. 5 for zeroing and for the direct reading of the gamma of the strip being measured.

Figs. 5, 6 and 7 show another form of densitometer to which the gamma scale of the present invention may be applied. The densitometer is schematically shown in Fig. 5 and comprises in general, the light source in the form of an electric lamp 50 which directs the light beam 51 through an aperture 52 onto the sample or strip 25 to be measured. A light-sensitive element, such as a photo-tube 53, is positioned in the path of the light rays transmitted by the film strip 25 being measured. The tube 53 is connected by a lead 54 to a power supply device 55 which, in turn, is connected to a meter 56 provided with a scale 57 over which a pointer 58 may move. Electrical energy is supplied to the power supply 55 through suitable leads 59 connected to a suitable electrical outlet, not shown. The construction of the power supply device 55 is such that equal changes in the density of the strip 25 impart equal movements to the pointer 58 so that the scale 57 may be uniformly divided, as best shown in Figs. 6 and 7. As the structure so far described does not constitute a part of the present invention, further detailed description is not deemed necessary. A densitometer of this type is now marketed by the Agfa Ansco Company under the name of "Ansco-Sweet Densitometer" and is utilized in measuring directly the density of any step of a film or sensitometric strip.

This densitometer, like those now in use, does not provide any means by which a gamma may be determined or indicated directly. The present invention, therefore, provides an auxiliary scale adapted to be used in conjunction with the density scale 57 and pointer 58 to read a gamma directly. This auxiliary scale 60 is arcuate in shape to conform to the scale 57, and is adapted to be positioned above the density scale 57 in position to cooperate with the pointer 58, as clearly illustrated in Figs. 6 and 7. This auxiliary scale 60 is also calibrated in terms of the gamma which each density reading of the sample or film strip 25 would represent if considered as the difference in density between two selected points on the strip.

When no film is in position, the gamma scale 60 is moved to the left, as viewed in Figs. 5 and 6, so that the zero of the gamma scale registers with the pointer 58 and the zero of the density scale 57. Such movement serves to zero the entire instrument and can be secured by any suitable means such, for example, as by a rack and pinion 61 and 62 actuated by a control knob 63, as schematically illustrated in Fig. 6. Now when the first step of the strip is in position over the aperture 14, the pointer 58 will be deflected to a position, such as shown in full line in Fig. 7 to indicate directly the density of that step of the strip. The gamma scale 60 is now moved, by means of the rack and pinion 61 and 62, or any other suitable means, to bring the zero of the gamma scale 60 into registry with the positioned pointer 58, as shown in Fig. 7. Thus the pointer serves to zero the gamma scale 60 when the first step is in position. Now, when the next step of the strip is positioned over the aperture 14, the needle or pointer 58 will move to another position, such as that indicated in the dotted line in Fig. 7 to indicate the density of this new step. Now as the gamma scale 60 is calibrated in terms of gamma, the portion of the gamma scale in alignment with the dotted position of the pointer 58 will indicate directly the gamma of the strip between the two points measured. In the illustration shown, the gamma is approximately .40.

Thus the two positions of the pointer are utilized to first initially adjust or zero the gamma scale and to then indicate directly the gamma between the two steps measured. By means of this arrangement, as well as the structure shown in Figs. 3 and 8, the gamma may be determined from only two steps of the strip. In all the modifications, the gamma scale is adjusted to zero or zeroed when the first step is in exposing position so that the density variation between the steps can be read directly in terms of the gamma between said steps, rather than indirectly in terms of the individual densities of the steps. While only a single scale is shown in connection with the structure shown in Figs. 5, 6, and 7, it is apparent that two scales may be utilized as in the example illustrated in Fig. 1. Also additional scales may be provided on the wedge 27 for differently spaced steps, if desired. Two such scales have, however, been found to be adequate.

Thus the gamma can be easily read and accurately ascertained without necessitating the taking of a large number of density readings or the plotting of the usual curve. Furthermore, the density scales of the present invention may be easily attached to existing densitometers without necessitating any material alteration in the structure thereof. In addition, by properly adjusting the gamma scale, the devices may be used as a regular densitometer if desired, but may be readily converted into a gamma-reading device if and when desired.

While the above-described devices are primarily intended for measuring the gamma of a sensitometric strip, it is apparent that they are equally well adapted for use in measuring the contrast or density range between two points on the negative. In such a case, the graduation of the gamma scale would be altered to suit the particular unit being measured. Also, as a range of 1.0 would be ample for the gamma wedge, as compared to 3.0 for the density wedge, the gamma scale could be spread out thus giving a more accurate, and more easily readable scale.

While certain embodiments of the invention have been disclosed, it is to be understood that the inventive idea may be carried out in a number of ways. This application is, therefore, not to be limited to the precise details described, but is intended to cover all modifications thereof falling within the scope of the appended claims.

I claim:

1. In a densitometer for indicating the density difference between two steps on a photographic sample, the combination of light means positioned to provide both a direct light beam for illuminating said sample and also a reflected comparison light beam, a pair of density wedges positioned in one of said beams, one of said wedges being adjustable relative to the other wedge to vary the intensity of the transmitted light of said beam inversely to the light transmitting quality of one of said steps, said second wedge being adjustable relative to said first wedge when the other step is being illuminated and cooperating with said first wedge to vary the intensity of the transmitted light of said one beam inversely to the light transmitting quality of said other step, means for determining when the intensities of the light beams are equal and scale means carried by said second wedge and calibrated in terms of the gamma between the steps to indicate directly, when said other step is illuminated, the gamma between said steps.

2. In a densitometer for indicating the gamma between two steps of a sensitometric strip, the combination with light means for providing a direct beam for illuminating said strip and also a reflected comparison beam, a density wedge positioned in said direct beam and adjustable relative thereto when one of said steps is being illuminated to vary the light transmitted to said step to balance said beams, and means for determining when the intensities of the light beams are equal, of a second density wedge also positioned in said direct beam and movable to an initial position of adjustment when said first step is being illuminated but movable to another position relative to said first wedge when another step is being illuminated to equalize the intensities of the light beams, and a gamma scale carried by and movable with said second wedge to indicate directly the gamma between said steps when said second wedge is moved to the other position, said scale being calibrated in terms of the gamma between said steps.

3. In a densitometer for indicating the difference in density between two selected steps of a sensitometric strip, the combination with a light source for providing both a direct beam for illuminating said steps and also a reflected comparison beam, a light sensitive element positioned in said beams, means for alternately passing said beams to said element, a meter operatively connected to said element to indicate the balance of said beams, of a density wedge positioned in one of said beams and adjustable when one of said steps is being illuminated to balance the light intensity of said beams, a second density wedge also positioned in said one beam and adjustable to a zero position relative to said first wedge when said first step is being illuminated but movable relative to said first wedge to balance said beams when another step is being illuminated, and a scale on said second wedge for indicating the movement of said wedge in terms of the gamma between said steps.

4. In a densitometer for indicating the density difference between two steps on a photographic sample, the combination with light means positioned to provide both a direct light beam for illuminating said sample and also a reflected comparison light beam, a density wedge adjustably positioned in one of said beams and adjustable relative thereto to indicate the density of the lower of said steps, means for determining when the intensities of the beams are equal, of a second density wedge positioned in one of said beams and maintained stationary when the density of said lower step is being measured and movable relative to said first wedge when the other of said steps is positioned in said first one beam, and a scale carried by said second wedge and calibrated in terms of the gamma represented by the differences in densities between said steps to indicate directly the gamma of said sample.

REGINALD T. LAMB.

REFERENCES CITED

The following references are of record in the file of this patent:

UNITED STATES PATENTS

| Number | Name | Date |
|---|---|---|
| 2,146,904 | McFarlane et al. | Feb. 14, 1939 |
| 2,164,513 | Gaebel | July 4, 1939 |
| 2,167,884 | Gartland | Aug. 1, 1939 |

FOREIGN PATENTS

| Number | Country | Date |
|---|---|---|
| 405,881 | Great Britain | Feb. 15, 1934 |
| 851,840 | France | Oct. 9, 1939 |